US007581938B2

(12) United States Patent
Leach

(10) Patent No.: US 7,581,938 B2
(45) Date of Patent: Sep. 1, 2009

(54) FRAME FOR CASTING POSITIVE IMPRESSION AND KIT THEREFOR

(76) Inventor: Pauline Leach, 82 Ashton Road, Newmarket, Ontario (CA) L3Y 5R5

( * ) Notice: Subject to any disclaimer, the term of this patent is extended or adjusted under 35 U.S.C. 154(b) by 708 days.

(21) Appl. No.: 11/081,606

(22) Filed: Mar. 17, 2005

(65) Prior Publication Data

US 2006/0208392 A1 Sep. 21, 2006

(51) Int. Cl.
*B29D 31/00* (2006.01)

(52) U.S. Cl. ........................... 425/2; 425/175; 425/218

(58) Field of Classification Search ..................... 425/2, 425/175, 218; 249/55, 102, 104, 155; 264/227
See application file for complete search history.

(56) References Cited

U.S. PATENT DOCUMENTS

| | | | | | |
|---|---|---|---|---|---|
| 2,558,650 | A | * | 6/1951 | Heineman et al. | 264/222 |
| 2,688,760 | A | * | 9/1954 | Forte | 12/146 M |
| 2,838,791 | A | * | 6/1958 | Theis | 425/2 |
| 2,909,805 | A | * | 10/1959 | James | 249/104 |
| 3,736,088 | A | * | 5/1973 | Jimenez | 425/218 |
| 4,012,026 | A | * | 3/1977 | Chambers | 425/2 |
| 4,828,116 | A | | 5/1989 | Garcia | |
| 5,390,680 | A | | 2/1995 | Brenner | |
| 5,658,597 | A | | 8/1997 | Breidenstein et al. | |
| 5,695,066 | A | * | 12/1997 | Bartlett | 425/317 |

* cited by examiner

*Primary Examiner*—Robert B Davis
(74) *Attorney, Agent, or Firm*—Mark B. Eisen; Dimock Stratton LLP

(57) ABSTRACT

A frame, kit and method for forming a positive impression of an object. The kit includes a supply of impression medium, the frame with a backboard, and a solidifying casting compound. A negative impression is temporarily made in the impression medium, then a casting compound can be poured into the resulting impression so as to form a positive impression which acts as a representative of the body portion being produced.

14 Claims, 2 Drawing Sheets

FRAME FOR CASTING POSITIVE IMPRESSION AND KIT THEREFOR

FIELD OF THE INVENTION

This invention relates to casting. In particular, this invention relates to a frame for casting a permanent positive impression, and a kit and method therefor.

BACKGROUND OF THE INVENTION

Hand and foot prints are among the first images that humans are known to have made, and are an expression of our primordial impulse to leave a mark. Parents will often cast an impression of their child's hand or foot print, so as to have a permanent memento from the child's younger days. Similarly, pet owners often wish to have a paw print to serve as a permanent reminder of their loyal companions. Creating castings of other articles or objects, including pieces of art, is also a popular artistic pursuit.

In a conventional form, a casting kit provides a negative impression in a casting compound. A typical casting kit for domestic use provides a container for containing a casting compound which is typically a solidifying substance, for example plaster. The plaster is poured into the container in liquid form, the object such as a child's hand, pet's paw etc. is depressed into the plaster, creating a negative impression of the object, and allowed to set. The object is then removed, and a permanent negative impression of the object remains in the plaster.

It is also possible to cast a positive impression, to provide a more realistic reproduction of the object, by adding a further step. In a positive casting process a deformable impression medium, for example sand, is placed in a container, and the object to be cast is used to make a temporary depression in the impression medium and then removed. A solidifying casting compound such as plaster is then poured into the temporary negative impression, and a positive casting is the finished product. The casting can then be framed, for ease of display.

However, positive casting is a multi-step process, and the granular nature of the impression medium makes it a fairly messy process. It would accordingly be advantageous to provide a casting kit that reduces or simplifies the steps involved in casting a positive impression, and makes it easier to perform the process with less mess. It would further be advantageous to provide a casting process that creates the casting and simultaneously frames the casting.

SUMMARY OF THE INVENTION

The present invention addresses these disadvantages by providing a frame that enables a user to cast a permanent positive impression of an object, for example a child's hand or foot print or a pet's paw print, and in a preferred embodiment a kit which includes all of the components required to cast the impression and allows the casting to be effected in a simple and relatively mess-free fashion. In the preferred embodiment the kit provides a supply of impression material and a container comprising a finished frame surrounding a cavity with a removable bottom into which the impression material is placed and utilized for making a negative impression.

A solidifying casting material such as plaster is then poured into the impression and allowed to set. The removable bottom is removed, exposing the finished frame and allowing the impression medium to fall out of the frame for disposal. The cast impression is adhered to the frame when the casting compound cures, and if desired the removable bottom may be affixed to the back of the frame to serve as a backing for the finished, framed impression.

Using the frame and method of the invention a user without any special skills is able to create an accurate casting of the object, quickly and with little mess, and the casting is framed as it is created to thereby obviate the need to frame the casting separately for display or exhibition.

The present invention thus provides a frame for casting a positive impression of an object, comprising a rear, a front surface defining a display opening having a front and a rear, the rear of the display opening opening into a casting base cavity, the casting base cavity being accessible from the rear of the frame, and a removable backboard for covering the front of the display opening during a casting operation and covering the rear of the frame after the casting operation.

The present invention further provides a casting kit for casting a positive impression of a body part comprising: a frame for casting a positive impression of an object comprising a rear, a front surface defining a display opening having a front and a rear, the rear of the display opening opening into a casting base cavity, the casting base cavity being accessible from the rear of the frame, and a removable backboard for covering the front of the display opening during a casting operation and covering the rear of the frame after the casting operation, a deformable impression medium for creating a negative impression of the object in the display opening, and a solidifying casting compound for casting a positive impression in the negative impression and adhering the positive impression to the frame.

The present invention further provides a method for casting a positive impression of an object in a frame having a display opening having a front defined by a front of the frame and a rear that opens into a casting base cavity, comprising the steps of: a. covering the front of the display opening, b. filling the display opening with a deformable impression medium, c. pressing the object into the impression material to create a negative impression, d. removing the object, e. pouring a solidifying casting compound into the casting base cavity, to fill the negative impression and at least a part of the casting base cavity, f. allowing the casting compound to solidify, and g. uncovering the front of the display opening to remove the impression material from the display opening, wherein the casting compound solidifies to create a positive impression in the negative impression and adhere the positive impression to the frame.

BRIEF DESCRIPTION OF THE DRAWINGS

In drawings which illustrate by way of example only a preferred embodiment of the invention.

DETAILED DESCRIPTION OF THE INVENTION

Figure 2:
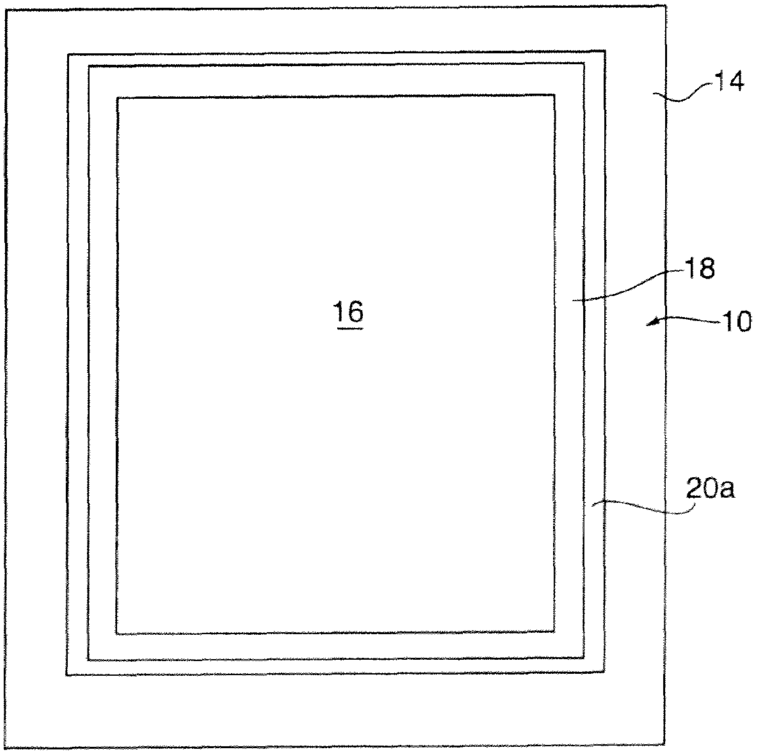
FIG. 2 is a rear elevation of a frame for the kit of FIG. 1.

The frame 10, illustrated in FIG. 2, is preferably composed of wood, but may be composed of cardboard, pewter, plastic or any other suitable material or combination of materials. The frame 10 comprises a preferably finished front surface 12, a rear surface 14, a display opening 16 having a front defined by the front surface and a rear opening into a casting base cavity 18 which in the preferred embodiment is larger than the display opening along the plane of the frame 10 (but does not need to be larger than the display opening 16). The casting base cavity 18 is accessible from a rear of the frame, preferably through a backboard recess 20 which in the preferred embodiment is larger than the casting base cavity 18 along the plane of the frame 10. The frame 10 includes a removable backboard 22 dimensioned to fit in the backboard recess 20 and against ledge 20*a*.

Figure 1:
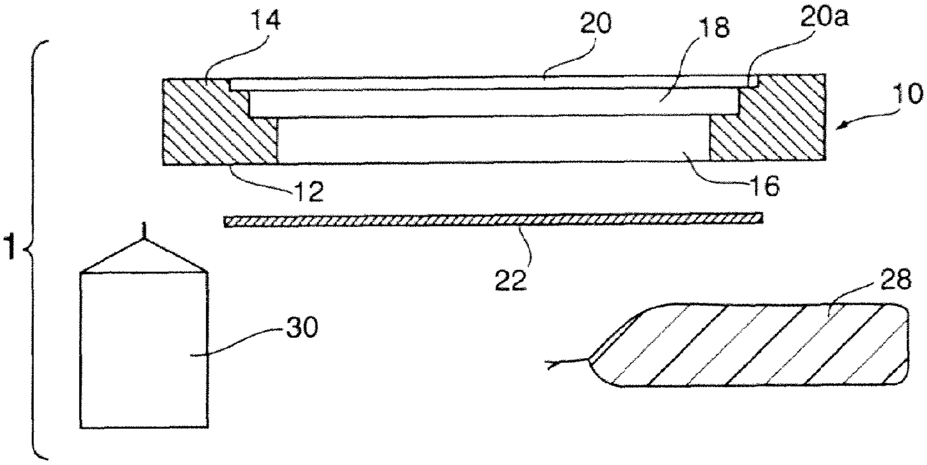
FIG. 1 is a cross-sectional view of a kit in accordance with the invention.

Provided as part of a kit, illustrated in FIG. 1, for convenience, may be a supply of a deformable impression medium, for example sand 28, which may be packaged in a bag or other suitable container; and a supply of a solidifying casting compound, for example plaster 30. The kit may also optionally include a smoothing board 24 (shown in FIG. 3B) for smoothing and levelling the sand 28 as described below. However, the frame 10 with backboard 20 may be sold on its own, and the purchaser can buy these other components of the kit separately.

Figure 3A:
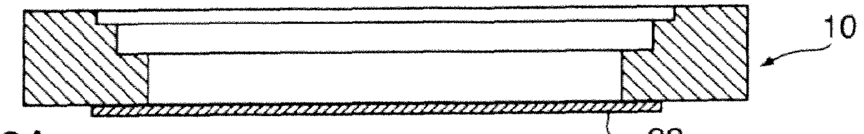
FIGS. 3A to 3G are cross-sectional views showing a preferred method of casting a positive impression using the kit of FIG. 1.
Figure 3B:
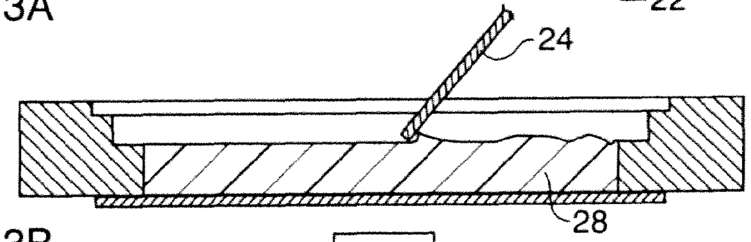
Figure 3C:
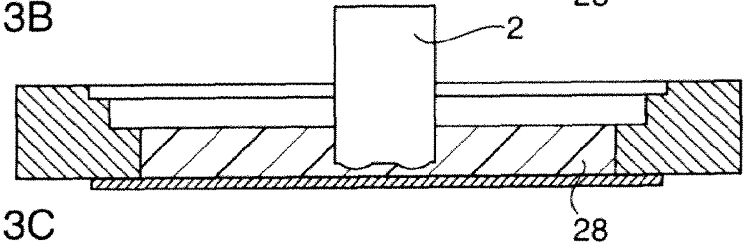
Figure 3D:
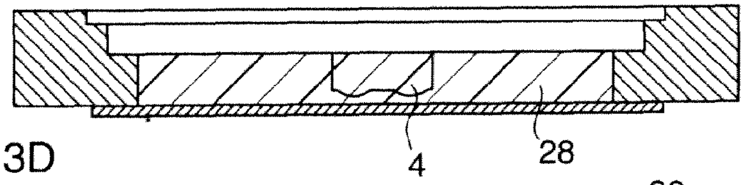
Figure 3E:
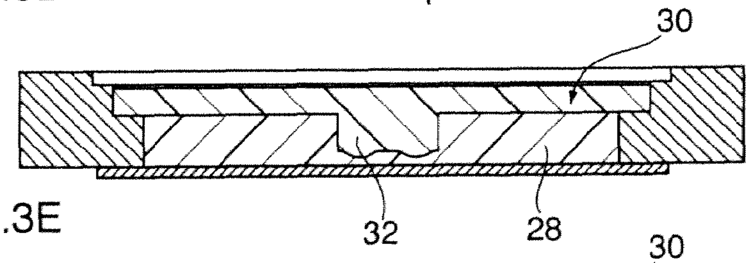
Figure 3F:
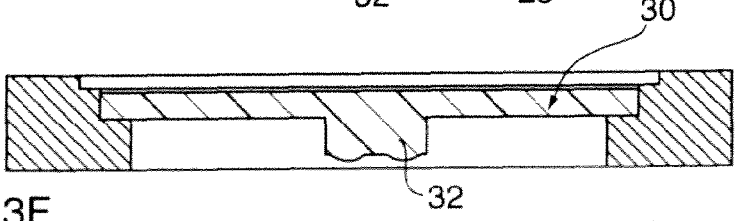
Figure 3G:
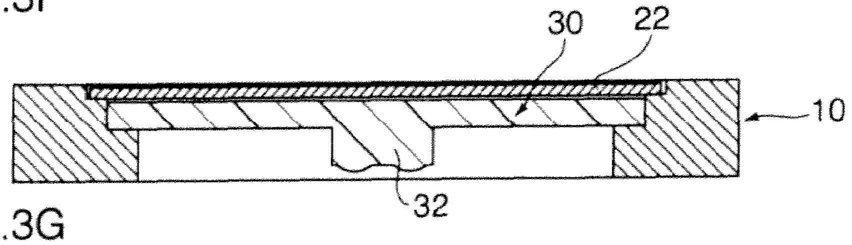

The preferred method of casting a positive impression according to the invention is illustrated in FIGS. 3A to 3G, as follows:

a. Covering the front of the display opening 16, shown in FIG. 3A. In the preferred embodiment using the backboard 22, however any other suitable cover may be used. The backboard 22 may be held to the frame temporarily during the casting process, for example using rubber bands or tape (not shown).

b. Filling the display opening 16 with a deformable impression medium 28. A material such as sand is suitable, but any other material that holds the shape of an impression and does not substantially deform under the weight of the plaster 30 is suitable. The display opening is filled to the level of the casting base cavity 18, as shown in FIG. 3B, to take maximum advantage of the depth of the display opening. Optionally a smoothing board 24 can be used to smooth and level the impression medium 28.

c. Pressing the object 2 into the impression material 28 to create a negative impression, as shown in FIG. 3C. The object 2 is pressed into the sand 28 face down so that the face of the object 2 is at the front of the frame 10.

d. Removing the object 2, as shown in FIG. 3D, which leaves a negative impression 4 in the impression medium 28. If the user is unhappy with the impression 4, the sand 28 is re-levelled and steps a. through d. are repeated until the user is satisfied with the result.

e. Pouring a solidifying casting compound 30, for example plaster (first mixing the compound with water, if necessary), into the casting base cavity 18. Sufficient casting compound 30 is used to fill the negative impression 4 and at least a part of the casting base cavity 18, preferably filling the entire casting base cavity 18 up to the ledge 20*a* (to leave room for the backboard 22 in the preferred embodiment), as shown in FIG. 3E.

f. Allowing the casting compound 30 to solidify. The casting compound 30 adheres to the frame 10 as it solidifies, anchoring the finished casting in place in the frame 10 and forming a background for the positive impression 32.

g. Uncovering the front of the display opening 16 to remove the impression material 28 from the display opening, as shown in FIG. 3G. The sand 28 drops out of the display opening 16 when the cover is removed, exposing the casting, and any residual sand can be brushed or blown off the casting. Preferably the backboard 22 is placed in the backboard recess 20 and clipped or otherwise affixed in place.

The frame 10 with the finished casting can be immediately hung in any conventional fashion, or placed for display or exhibition, the casting process of the invention having both created the casting and framed the casting at the same time. If desired, a plate with a name or other indicia may be affixed to the frame for display.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. A frame for casting a positive impression of an object, comprising a rear, a front surface defining a display opening having a front and a rear, the rear of the display opening opening into a casting base cavity for containing a deformable granular impression medium for creating a negative impression of the object in the display opening, the casting base cavity being accessible from the rear of the frame, and a removable board for removably covering the front of the display opening during a casting operation such that an impression can be made in the impression medium and a solidifying casting material can be introduced into the casting base cavity through the rear of the frame to create the positive impression and a backboard applied to cover the rear of the frame after the casting operation such that the impression medium can be removed out of the front of the display opening leaving the positive impression cast in the frame for display in the frame.

2. The frame of claim 1 wherein the casting base cavity is larger than the display opening along a plane containing the frame.

3. The frame of claim 1 further comprising a backboard recess, the backboard being dimensioned to fit in the backboard recess and against a ledge between the backboard recess and the casting base cavity.

4. The frame of claim 3 wherein the backboard recess is larger than the casting base cavity along a plane containing the frame.

5. The frame of claim 1 wherein the front surface of the frame is finished.

6. A casting kit for casting a positive impression of a body part comprising:

a deformable granular impression medium for creating a negative impression of the object in the display opening, a frame for casting a positive impression of an object comprising a rear, a front surface defining a display opening having a front and a rear, the rear of the display opening opening into a casting base cavity for containing the granular impression medium, the casting base cavity being accessible from the rear of the frame, and a board for removably covering the front of the display opening during a casting operation such that an impression can be made in the impression medium and a solidifying casting material can be introduced into the casting base cavity through the rear of the frame and a backboard applied to the rear of the frame after the casting operation such that the impression medium can be removed out of the front of the display opening, and a solidifying casting compound for casting a positive impression in the negative impression and adhering the positive impression to the frames, whereby the positive impression is cast into the frame and can be viewed through the front of the display opening when the impression medium is removed out of the front of the display opening.

7. The kit of claim 6 wherein the casting base cavity is larger than the display opening along a plane containing the frame.

8. The kit of claim 6 further comprising a backboard recess, the backboard being dimensioned to fit in the backboard recess and against a ledge between the backboard recess and the casting base cavity.

9. The kit of claim 8 wherein the backboard recess is larger than the casting base cavity along a plane containing the frame.

10. The kit of claim 6 wherein the front surface of the frame is finished.

11. The kit of claim 6 wherein the impression medium is sand.

12. The kit of claim 6 wherein the casting compound is plaster.

13. The kit of claim 6 comprising a smoothing board for smoothing the impression medium in the display opening.

14. The frame of claim 1 wherein the impression medium is sand.

* * * * *